United States Patent [19]

Klingaman et al.

[11] 4,268,320

[45] May 19, 1981

[54] PYROPLASTOID PARTICLES, COMPOSITION AND METHOD OF PRODUCTION

[75] Inventors: Richard M. Klingaman, Tonawanda; Leo C. Ehrenreich, Amherst, both of N.Y.

[73] Assignee: Penn Virginia Corporation, Philadelphia, Pa.

[21] Appl. No.: 126,152

[22] Filed: Feb. 29, 1980

Related U.S. Application Data

[63] Continuation of Ser. No. 921,523, Jul. 3, 1978, abandoned, which is a continuation of Ser. No. 786,513, Apr. 11, 1977, abandoned.

[51] Int. Cl.$^3$ ............................................ C04B 31/00
[52] U.S. Cl. .......................... 106/288 B; 106/DIG. 1
[58] Field of Search ................ 106/288 B, DIG. 1, 52

[56] References Cited

U.S. PATENT DOCUMENTS

| | | | |
|---|---|---|---|
| 2,987,408 | 6/1961 | Minnick | 106/DIG. 1 |
| 3,069,292 | 12/1962 | Alexander et al. | |
| 3,290,165 | 12/1966 | Iannicelli | 106/308 |
| 3,567,680 | 3/1971 | Iannicelli | 260/41.5 |
| 3,661,673 | 5/1972 | Merriam | 156/279 |
| 3,834,924 | 9/1974 | Grillo | 106/308 N |
| 3,839,253 | 10/1974 | Kersbaw et al. | 260/29.6 R |
| 3,980,611 | 9/1976 | Anderson et al. | 260/40 R |
| 3,994,705 | 3/1976 | Fujioka et al. | 428/331 |
| 4,005,254 | 1/1977 | Mackengie, Jr. | 174/110 PM |
| 4,036,663 | 7/1977 | Williams et al. | 106/308 B |
| 4,042,732 | 8/1977 | Ferran | 427/385 R |
| 4,043,831 | 8/1977 | Friedman | 106/288 B |

Primary Examiner—O. R. Vertiz
Assistant Examiner—Mark Bell
Attorney, Agent, or Firm—Pollock, Vande Sande and Priddy

[57] ABSTRACT

Particulate material, composites containing said material, and a method of making said particulate material. The material is composed of at least about 85% (number basis) of regular, well defined ellipsoidal particles and has a particle size less than about 25 microns, about 90% and 50% by weight of the particles being less than about 15 and about 10 microns respectively in size and has a specific surface in the range of about 0.75 to about 2.5 m$^2$/gram as well as a specific gravity of about 2 to about 3. The composites contain said particulate material and up to about 99% of one or more polymeric media. The particulate material may be prepared by subjecting a diverse mixture of flyash particles to dry air classification in an air classifier controlled to recover particulate solids as described above.

25 Claims, 3 Drawing Figures

PYROPLASTOID PARTICLES, COMPOSITION AND METHOD OF PRODUCTION

CROSS REFERENCE TO RELATED APPLICATION

This is a continuation of our prior co-pending application U.S. Ser. No. 921,523 filed July 3, 1978, which was a continuation of and co-pending with U.S. Ser. No. 786,513, filed Apr. 11, 1977, both now abandoned.

When finely divided coal is burned in suspension in a boiler, as in a coal-fired electric power generating plant, combustion converts ash and magnetite components of the coal into "flyash" particles. These depart the combustion chamber suspended in the gaseous and vaporous products of combustion. This suspension is then passed through an appropriate device, such as an electrostatic precipitator, to separate the particulate matter from the gases and vapors, thereby reducing the concentration of solid pollutants discharged into the atmosphere through the plant smoke-stack.

However, "flyash" is not a precise term of definition. For instance, the materials described as "flyash" can vary widely from plant to plant, depending upon a variety of factors including composition of the coal, furnace and separator design and combustion conditions. Moreover, the "flyash" being collected at a given plant at a given instant includes particles of widely varying particle size, density, shape, porosity, internal structure, surface chemistry and other properties. Accordingly, prior literature references setting forth specific particle sizes, densities, chemical analyses and the like for a given flyash generally constitute average or approximate values for a multitude of particles in a sample, in which many of the particles differ widely from the average values. Thus, "flyash" may be aptly described as a composition of diverse particles, which varies from plant to plant. Hereinafter, the unmodified term "flyash" refers to this varying, diverse material.

The abundance and low cost of flyash has created interest in finding uses for it. Early attempts at utilization involved the use of flyash itself. Thereafter, more and more effort focused on isolating specific fractions of the flyash and preparing specially modified forms thereof, such fractions or modifications being chosen based upon what was thought most advantageous for the contemplated end use.

For example, U.S. Pat. No. 2,892,240 discloses the use of flyash as a filter aid in filtration of a city water supply. The flyash is a modified flyash prepared by moistening flyash with a volatile solvent for metal salts present in the flyash, drying the moistened material and subsequently calcining the dried material.

U.S. Pat. No. 2,987,406 discloses the preparation of cement containing a high density flyash fraction. The latter is composed of sphere-like particles consisting essentially of a silica-alumina glass envelope and matrix having dispersed therein crystallites of a ferromagnetic spinel, said particles containing between about 70 and about 95% of iron, expressed as $Fe_2O_3$.

U.S. Pat. No. 2,987,408 discloses Portland Cement containing a flyash fraction composed of discrete, substantially sphere-like particles having a particle size less than about 200 mesh and a specific gravity from about 2.1 to about 2.6, consisting essentially of glass comprising silica and alumina, and preferably having a surface film or coating comprising a water soluble salt, which film enhances the pozzolanic action of the particles.

U.S. Pat. No. 3,533,819 suggests dividing flyash into a sintered aggregate product, an iron concentrate product, an improved pozzolan product and a carbon product by (1) separating flyash into a first iron concentrating product and a low iron contact fraction; (2) separating the low iron content fraction into a second, improved pozzolan product and another fraction; (3) screening the latter fraction to obtain a third, carbon product containing a minimum of 25% by weight of carbon and a sinter fraction; and (4) agglomerating the sinter fraction while adjusting the amounts of the first, second and third products removed from the production stream to maintain substantially uniform quality in the fourth product.

Depending on raw material and plant variables discussed above, some power plants produce flyash having a relatively high percentage by volume, e.g. up to 30%, of hollow spherical particles; other plants do not. U.S. Pat. No. 3,585,155 discloses flyash-asphalt mixtures containing the type of flyash having hollow spheres, which in this instance ranged in average particle size from 1 to about 80 microns.

It has been proposed in U.S. Pat. No. 3,765,920, to prepare bloated aggregates by mixing "flyash" with sodium or ammonium hydroxide and a water soluble carbohydrate, forming the mixture into aggregates, drying them and firing them at a sufficiently high temperature to cause fusion and bloating of the aggregates. It was also suggested that such aggregates be formed into a variety of shaped products such as acoustical or heat insulating blocks or panels with or without the assistance of a binder.

U.S. Pat. No. 3,901,991 discloses production of non-combustible shaped articles containing a silica material, lime, mineral fibers, water and a soluble inorganic binder, in which the silica filler is flyash having a particle size of approximately 5 microns.

Heretofore, flyash and flyash components have been employed as fillers and extenders for filled synthetic polymer composites. As evidenced by U.S. Pat. No. 2,895,935 and others, much of the activity in this area of utilization apparently involved incorporation of flyash per se in thermoset and thermoplastic resin systems. U.S. Pat. No. 3,991,005 discloses composites of thermosetting or thermoplastic resin and flyash in which the individual flyash particles are characterized by non-porous structure and irregular, rough shapes having a heterogenous size distribution less than 50 microns, e.g. 35-45 microns, which are said to give composites with good structural properties. By way of contrast, U.S. Pat. No. 3,755,242 teaches that flyash with a "submicron" particle size yields low density (4 pounds per cubic foot) foams which are friable, whereas foams of about the same density prepared with titanium dioxide and concrete dust are strong. Several applications of flyash as filler for polyesters and polyester foams are disclosed in U.S. Pat. Nos. 3,805,533, 3,884,844 and 3,896,060. U.S. Pat. No. 3,577,380 teaches that flyash particles include hydroxyl groups on their surfaces which can react with polyfunctional isocyanate compounds and elastomers having pendant carboxyl groups, so that the flyash contributes to stiffening of the resulting polymer.

Notwithstanding the advantages of flyash suggested in the foregoing patents, there has been an apparent need for further improvements. This need has manifested itself in growing enthusiasm for a particular flyash fraction known as cenospheres.

In this connection, U.S. Pat. No. 3,830,776 proposes the preparation of shaped articles comprising a polymeric matrix in which is distributed beads having a specific gravity of less than 1.25, separated from flyash by selective floatation and having a particle size range of about 50 to 200 microns. So that they will have adequate crush strength, the beads are subjected to hydrostatic pressure in a high pressure cell and cycled several times from a 50 psig threshold pressure to a test pressure and back, while monitoring crushing acoustically, and are checked for extent of crushing by the change in volume of the water in the test cell and by the density of the beads before and after the pressure sequence.

In a paper entitled "Cenospheres," paper no. A-4, 3rd International Ash Utilization Symposium, 1973, Dr. J. W. Pedlow reviews the properties, uses and availability of "floaters," hollow spheres 20–200 microns in diameter having a particle density in the range of 0.4 to 0.6 grams per cubic centimeter, which decrepitate on heating to 300° C. Dr. Pedlow's company has used floater cenospheres as a lightweight filler to reinforce fire retardant and burn-through resistant vinyl mastic employed as an adhesive for electrical cable tape. However, Dr. Pedlow also reports on the work of other researchers. The replacement of glass microspheres with cenospheres in syntactic foam was reported. Use of cenospheres in liquid epoxy systems for electronic castings was also disclosed. Incorporation of cenospheres in rigid foamed-in-place urethane resins was said to lower the cost and improve the physical properties of the resultant foam. It was also stated that polyester-cenosphere composites had been molded into ornamental panels. Unfortunately, as Dr. Pedlow has also reported, floater cenospheres have a limited availability in that they are produced by some power plants and not others. An investigation disclosed that three plants in the Kanawa Valley supply most of the cenospheres which are being used, while seventeen power stations in the Ohio River Valley Basin had virtually no cenospheres in the flyash they produced.

H. Jan de Zeeuw and Roland V. Abresch have suggested that non-floating cenospheres may be recovered from beneath the surfaces of ash ponds; *Ash Utilization, Proceedings:* 4th International Ash Utilization Symposium, 1976, pages 386–395. This particulate material includes particles ranging in size from one third to two hundred microns and has a density of approximately 50 pounds per cubic foot (0.8 grams per cubic centimeter), with walls which are generally thicker than those of the floater cenospheres. It is indicated that the wall thickness of at least some of the particles can be up to thirty percent of the diameter of the sphere.

U.S. Pat. No. 3,917,547 discusses the use of cenospheres in polyurethane foams. It was suggested that the inclusion of up to 75% by volume of cenospheres improves the tear strength, compressive strength, and other properties of the foams. Since the results obtained are most directly related to the percentage of cenospheres present in the flyash, it is suggested to use flyash enriched in cenospheres recovered by dumping flyash into water and collecting the floating particles.

Apparently, those researchers who have given detailed consideration to synthetic resin/flyash interrelationships have attributed superiority to flyash or flyash fractions characterized by abundant quantities of hollow particles. Contrary to the expectations produced by these teachings, we have discovered a material which has excellent utility in synthetic resin composites, and which does not involve a requirement for an abundant content of hollow particles.

SUMMARY OF THE INVENTION

The present invention is a particulate material, useful as a filler for polymeric media, having a novel combination of shape, size, specific surface and density. Additional properties are present in particularly preferred embodiments.

The particulate material is composed substantially of particles having a well-defined regular ellipsoidal shape, i.e. spherical. However, contrary to what has been emphasized in the art heretofore, hollowness is not an essential feature, and in preferred embodiments disclosed hereinafter the material is composed substantially of non-hollow particles.

In general, the particles are less than about $25\mu$ in particle size, with about 90% by weight of the particles having a particle size less than about $15\mu$ and 50% being less than about $10\mu$. Thus, the material is clearly distinguishable from common pozzolans. Preferably about 90% and about 50% by weight of the particles have particle sizes less than about $12\mu$ and about $7\mu$, respectively. Herein, particle size is expressed on the basis of Coulter Counter or other suitable measuring techniques.

The specific surface of the particles, determined by the BET or other suitable method, is generally in the range of about 0.75 to about 2.5 square meters per gram, and is preferably about one to two square meters per gram, with about 1.1 to about 1.7 square meters per gram being particularly preferred. Common flyash, as collected by the electrostatic precipitators of a power plant, generally tends to vary widely in specific surface, does not dependably fall into these ranges, and will often or usually be outside these ranges.

In contrast with floater cenospheres, the particulate product of the present invention has a specific gravity in the range of about two to about three. Preferred are products from which recoverable iron particles have been removed by magnetic separation and which have a specific gravity of about 2.2 to 2.6, with a specific gravity of about 2.35 to about 2.5 being particularly preferred.

As the product is composed substantially of aluminosilicate glass, it is generally amorphous. However, it may contain scattered particles of crystalline material such as mullite, hematite, magnetite and others. However, the amount of crystalline material will represent a very minor proportion of the total weight of material, usually less than about five percent.

Particularly preferred forms of the product possess one or more of the following additional attributes. Optionally, they contain less than one percent by weight of components soluble in water at room temperature, or of components which are thermally labile at 500° C. or both. Optionally the particles have surfaces receptive to tenacious coupling with polymeric media or with silane or titanate coupling agents or with both. The quantity of calcium oxide and hydroxide which is available on the surfaces of the particles for reaction with acid, if any, is less than 10% and preferably less than 1% of the total particle weight. The preferred substantially non-hollow form of the invention is stable against decrepitation at 300° C. and preferably at 600° C.; because of its non-hollow nature, it is highly resistant to crushing during mixing, extrusion, molding or the like, but is capable of being ground in a ball mill with steel balls.

The invention also includes composites, as above defined, containing, by volume, about 15 to about 99 percent of one or more polymeric media and about one to about 85 percent of the above-described particulate material. The composites consist essentially of the media and particulate material, which includes, for example, the alternative of replacing up to about three quarters of the above-described particulate material, on a volume basis, with filler(s) or extender(s) of larger particle size(s) up to about 100 microns to provide multi-modal packing. Preferably the volume percentages of media and particles are about 50 to about 95 and about 5 to about 50 respectively.

The invention is also directed to a method of producing the above-described particulate material. Finely divided coal is burned in turbulent gaseous suspension at a sufficient temperature to melt the ash component(s) thereof and to produce flyash of varying composition including a diverse mixture of particles including appreciable quantities of particles which are of both uniform and irregular shape, both spherical and non-spherical, hollow or non-hollow, both larger and smaller than about $25\mu$, and both within and without the specific surface range of about 0.75 to about 2.5 $m^2$/gram, including particles with a specific gravity of two to three. Flyash particles are formed in suspension in hot gaseous products of combustion of said coal. This flyash may then be separated from the combustion gases, such as by electrostatic precipitation and/or mechanical separators. At least a portion of the diverse mixture separated from the combustion gases is subjected to dry air classification in an air classifier. The air classifier is controlled to produce or recover a particulate product composed substantially of regular-shaped substantially spherical particles having a particle size less than $25\mu$, about 90% and 50% by weight of which are less than about 15 and $10\mu$, respectively, in particle size, having specific surface in the range of about 0.75 to 2.5 $m^2$/gram and a specific gravity of about two to three.

Additional optional steps may be employed when desired. For instance, when the precipitation product includes recoverable magnetic components, such product may be subjected to dry magnetic separation to isolate a "non-magnetic" fraction to which the above air-classification step is then applied. If desired, such as for instance when the precipitation product contains an unusually small percentage of the final product, the material fed to the air classification step may be a pozzolan obtained by subjecting the flyash (with or without intervening magnetic separation) to a preliminary dry air classification step to recover a fraction in which at least about 75% by weight of the particles will pass a 325 mesh sieve and have a Blaine fineness of about 2000 or greater, and a rejects fraction. It is preferred to conduct the process with combustion, electrostatic precipitation, dry magnetic separation, preliminary dry air classification, and further dry air classification, in that order.

ADVANTAGES OF THE INVENTION

Different embodiments of the invention exhibit different advantages in varying degree. Thus, the invention provides the art with one or more of the following advantages.

A particular advantage is that the composition of the invention is not subject to the same availability limitations as cenospheres. Since hollowness is not an essential feature of the filler of the present invention, the producer has a wider selection of sources of flyash to employ as raw material. He is not limited to those relatively few plants which produce floater cenospheres in abundance nor to those plants which produce the non-floating cenospheres adverted to in the above-mentioned article by de Zeeuw and Abresch.

The invention has certain advantages of uniformity, both as to particle characteristics and the behavior of the particles in the production of composites. Thin-walled cenospheres have a tendency to fracture while the composites which contain them are being subjected to shear, compression and other forces during formation of shaped particles, i.e. during the formation of sheet molding compounds, molding and extrusion. The resultant debris of sharp-edged fragments can have a tendency to scratch highly polished surfaces of molds and extrusion dies, and can also undesirably alter, in relatively unpredictable degree, the rheological properties of the composite material. Also, such fracture results in a volume loss.

The possibility of avoiding the above-mentioned difficulties may provide an explanation for the interest in non-floater cenospheres discussed in the above-mentioned de Zeeuw et al. paper and the apparent or supposed necessity for compression testing of cenospheres as discussed in U.S. Pat. No. 3,830,776. However, certain of the production techniques which would tend to maximize the recovery of cenospheres from flyash also tend to increase the quantity of frangible or irregular particles recovered; contrariwise, attempts to reduce the recovery of frangible particles tend to reduce the yield and/or further limit the suitable sources of raw material.

The particulate material of the present invention is highly resistant to fracture under shear and compression—far more so than floater cenospheres—, does not ordinarily require compression testing and does not require production techniques which favor inclusion of frangible particles therein. Accordingly, the material of the present invention is less prone either to induce wear of molds and dies or to produce unanticipated or quantitatively unpredictable viscosity build up in polymeric composites. Moreover, the present invention usually makes available a larger proportion of small particles than are generally available in floater or non-floating cenospheres.

Pedlow indicated the existence of certain problems with cenospheres relating to drying. Although he indicated progress had been made toward solving or at least reducing these problems, it is apparent that the product of the present invention does not require drying, unless it has been wetted for some desired purpose.

Compared to the common commercially available glass beads, which are produced by an energy intensive process, the material of the present invention is of smaller average particle size and less costly. Moreover, the material of the invention offers the possibility of improved bonding to polymeric media in composites.

As compared to Pozzolan, when formed into composites, the material of the present invention introduces less rough, irregular-shaped "debris." Thus, there is less tendency for wearing of molds or extrusion dies in the shaping of the composites. The invention has this same advantage over flyash, usually in greater degree. Accordingly, it should be apparent that flyash, pozzolan, and cenospheres do not possess all of the advantages of the present invention.

DESCRIPTION OF PREFERRED EMBODIMENTS

Figure 1:
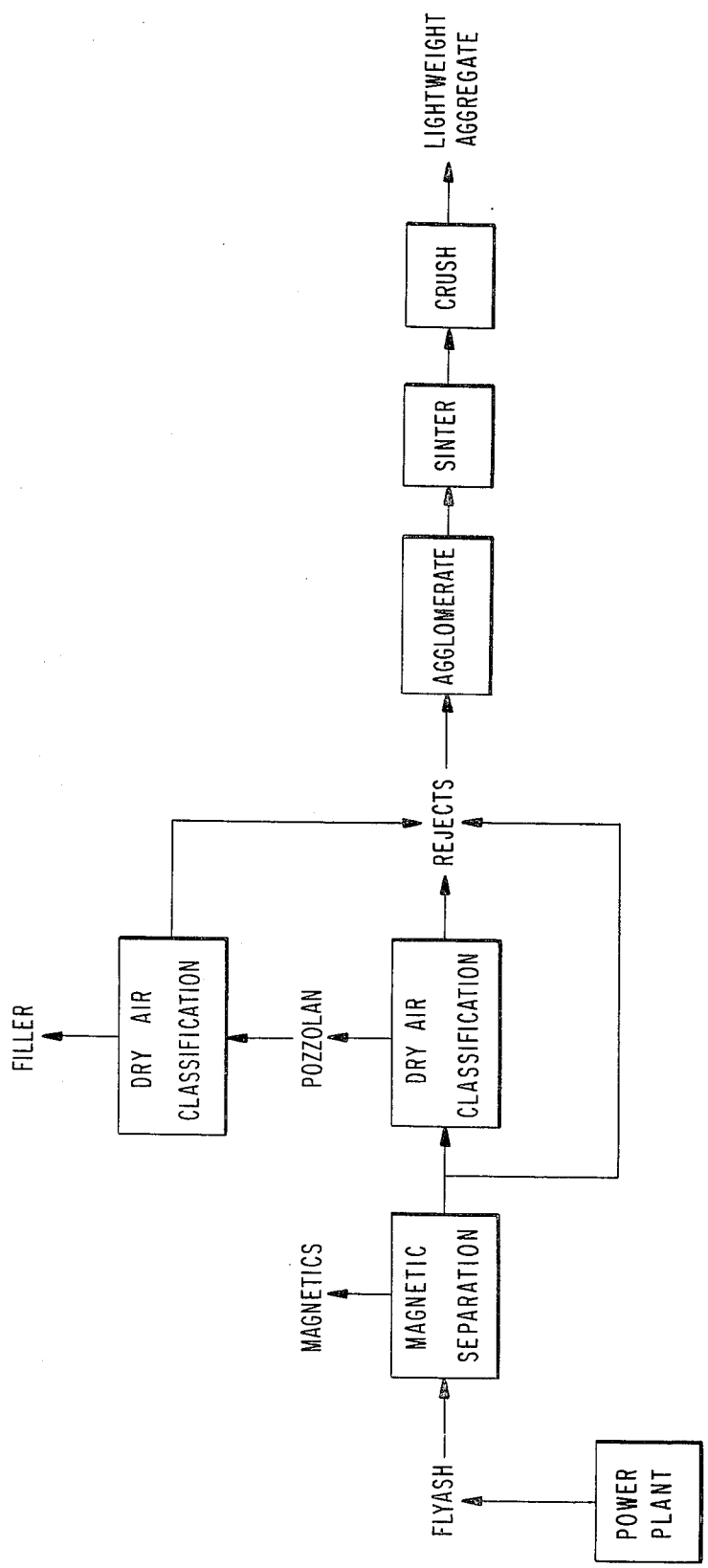
FIG. 1 is a flow sheet of an embodiment of the process by which the filler material of the invention is produced.

As indicated above, the particulate material of the present invention is composed substantially of particles having a well-defined regular shape; that is, the particles are, with relatively few exceptions, characterized by a definite and characteristic common shape. This is in contrast to the flyash characterized by relatively abundant quantities of rough and irregular-shaped particles described in U.S. Pat. No. 3,991,005. In general, the particulate material of the invention is considered substantially regular if at least about 85%, 90%, or most preferably about 95% of the particles, on a number basis, have the requisite well-developed, definite and characteristic shape.

An example of an appropriate characteristic shape is ellipsoidal; that is the particles appear elliptical or circular when viewed in a micrograph taken with a scanning election microscope (SEM) at a magnification of about 2000× and a power of 20 KEV. Thus, if about 85% or more of the particles are ellipsoidal, as opposed to random-shaped or cinder-like particles, the material is said to be substantially regular in shape.

It is particularly preferred that at least about 77%, more preferably about 83% and most preferably about 90% of the total number of particles be spherical, when examined as described in the preceding paragraph. Spherical particles, an example of uniform shaped particles, can be identified in a SEM micrograph of sufficient magnification, e.g. 2000×, by drawing two circles for each particle which is examined, including the largest circle which will fit completely within the image of the particle, and the smallest circle which will completely encircle it. When the difference in the diameters of these two circles is about 10% or less based on the diameter of the smaller circle, the particle is said to be spherical.

As noted above, the particulate material of the invention has the advantage that inclusion of hollow particles is not a critical feature. The material produces composites having commercially acceptable properties even though substantially non-hollow. For purposes of the present invention, a particle is considered non-hollow unless it has a central void having a diameter of about 0.4 D or larger, where D is the overall diameter of the particle as a whole. Because the ratio of the overall volume of a hollow particle to the volume of its internal void is a function of the cubes of their respective radii, the volume of a void smaller than 0.4 D represents a very small proportion of the overall particle volume. It can be demonstrated that a central void of these proportions has a small or negligible influence on the specific gravity of the particle.

The presence and quantity of non-hollow particles in a particulate material may be determined by preparing a composite of a representative sample of the material in a durable resin matrix, such as an epoxy, smoothly polishing an outer portion of the resultant composite to produce a level surface in which particles have been ground down to provide flat faces for exposing cross-sections of their internal structure, and then examining the sample microscopically. The above-described sample preparation technique is known as "potting and polishing." When a sample has been prepared carefully to avoid undue amounts of either tearing of particles out of the matrix or of abrading the edges and surfaces of the particles, and the polished surface of the composite has been micrographed with an SEM at appropriate levels of magnification and contrast, a trained observer can count the voids present in the exposed random cross-sections. Generally, when exposed random cross-sections of the particulate material of the invention are examined in the above-described manner, differentiating voids from areas of differing particle composition (i.e. inclusions of crystalline material) it will be found that less than 10% and preferably less than 5% of the total number of cross-sections disclose the presence of voids. When the sample of cross-sections examined is sufficiently large, i.e. 2500 or more, the foregoing percentages can be translated mathematically into a boundary value for non-hollow particles as above-defined, at an appropriate confidence level. At a confidence level of 99.5%, preferably about 85% or more of the particles in the particulate material are non-hollow.

In general, coal flyash is considered to contain, by weight, approximately 34–50% of $SiO_2$, 17–30% $Al_2O_3$, 7–26% of $Fe_2O_3$, 1–30% of CaO, 2–20% of residual carbon and varying smaller proportions of MgO, $SO_3$, and, in certain instances, a water soluble surface film representing up to about 2 or 3% by weight of the particle, of water soluble salts, such as sulfates, and sulfuric acid. In the production of the particulate material of the present invention, the content of $SiO_2$ and $Al_2O_3$ is selectively concentrated; the contents of other components are reduced. As can be seen from the specific gravity data given above, the iron content of the present product is far less than the 70% iron suggested in U.S. Pat. No. 2,987,406, and usually less than 15%, preferably less than 5% by weight, as $Fe_2O_3$. Calcium oxide will generally be less than 10%, preferably less than 5% and most preferably less than 1%. Much of the residual carbon is removed, as are most of the large and irregular particles of $SiO_2$ and $Al_2O_3$. Thus, the product of the invention is an aluminosilicate glass, also referred to as silica-alumina glass, in the form of particles having the above-described characteristics of regularity, particle size, surface area and specific gravity, which generally contain about 1 to about 3 parts by weight of silica per part of alumina, and usually about 1¼ to 2½ parts by weight of silica per part of alumina. The product, as recovered by air classification, will normally be receptive to tenacious bonding with inorganic or organic media. However, if the particles have materials on their surfaces which tend to interfere with bonding, such materials can normally be removed and/or converted to a non- or less-interfering form by water washing, acid washing, oxidation, thermal treatment and/or other appropriate means.

In general, the particulate material of the invention is composed of substantially discrete, isotropic particles, i.e. the particles are unbloated and unsintered. Therefore, they are readily distinguishable from the bloated and sintered products of U.S. Pat. Nos. 3,765,920 and 2,933,796.

The particulate material of the present invention may be prepared by a variety of methods, with or without air classification. For instance, the products may be prepared by sieving. However, it is preferred to prepare the filler of the present invention as a sidestream from a conventional process for producing light weight aggregate. FIG. 1 of the accompanying drawings illustrates this.

In the conventional process, flyash from a power plant is subjected to magnetic separation to produce a magnetic fraction and a "non-magnetic" fraction. A "non-magnetic" fraction is one of two or more fractions of materials separated by magnetic separating device, such as a roll separator, which is relatively less magnetic than the other fraction or fractions, even though it may contain some magnetic material. The non-magnetic fraction is subjected to dry air classification to recover pozzolan, which finds wide industrial use as a partial substitute for Portland cement. The rejects from such dry air classification, i.e. the non-pozzolan material, are subjected to agglomeration, sintering and crushing in sequence to produce lightweight aggregate. In the foregoing process, all or part of the non-magnetic material may be bypassed around the dry air classification step, or the non-magnetic fraction be divided into two portions, one of which is subjected to dry air classification and the other of which will be sent directly to the agglomeration step. The techniques required for carrying out the procedures just described are all familiar to persons skilled in the art.

Figure 2:
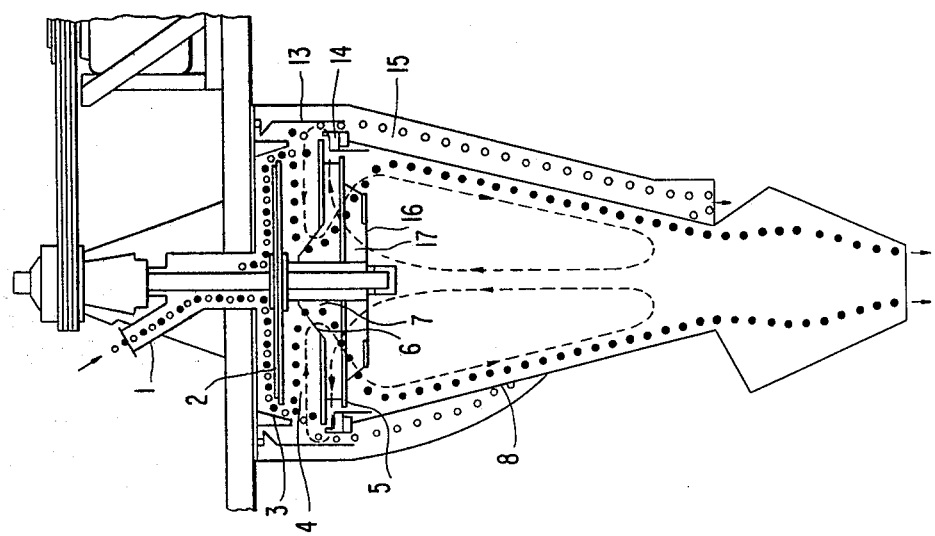
FIG. 2 is a vertical sectional schematic view of apparatus useful in producing the filler material of the invention.

According to the presently preferred embodiment of the present invention, the above-described pozzolan product is subjected to a further dry air classification in an apparatus capable of making a relatively sharp separation between particles having a particle size of a few microns from larger particles. All available air classifiers do not necessarily make a fine enough separation, but there are several units commercially available which are believed to do so. The unit which we prefer to use, illustrated schematically in FIG. 2, is the model 400MPVI sold under the trademark "MIKROPLEX" by Alpine American Corporation. This machine operates according to the principle of causing particles to move in air in a spiral in a flat cylindrical chamber at equilibrium between particle centrifugal force and centripetal friction drag of the air. The walls of the classification chamber are rotated for reducing boundary layer disturbances on the separation of particles. At the chamber periphery, the classified product is purged with recycled classifying air. Fines are recovered in a housing which contains the air classifying chamber. For a general description of the operation of this device, reference is made to FIG. 2.

As shown in FIG. 2, the feed material falls through inlet 1 on to the feeder plate 2, where it is accelerated and hurled by bumper ring 3 into the classifying chamber 4; where classification into fine and coarse fractions takes place. The dust-air mixture, following a spiral path, is sucked in by the cross flow fan 5 and blown through a system of channels into the fines cyclone 8, where separation is effected. The centrifugal force prevailing in the classifying chamber flings the coarse material to the outside. There it strikes the coarse product brake ring 13, located at the periphery of the classifying chamber, whence it falls into the coarse product chamber 15. The classifying air is forced with a powerful twist through the rejecting blades 14, into the classifying chamber, through which it follows a spiral path. It is then drawn through the upper opening 6 of the cross flow fan into the descending channels 7, where the pressure and twist required for operating the cyclone 8 are produced. The air freed from dust is now drawn through the opening at the bottom 16 of the cross flow fan into the ascending channels 17 and recirculated into the classifying chamber. Thus, the circuit of classifying air is completed. The rejecting blades 14 prevent the coarse product from being hurled back into the fines cyclone.

As indicated above, the particulate material of the present invention may be used in composites with organic or inorganic binders. However, it is preferred that more than half, and preferably substantially the entire weight of components which bind the particulate material in the composites is organic binder material. Normally, the filled synthetic polymer composites contemplated by the present invention will be solid compositions of matter comprising the solid particulate material of the present invention embedded in any polymer material including natural or synthetic; rubbery, elastomeric or resinous, thermosetting or thermoplastic and porous or non-porous polymeric media. In general, the particulate material of the present invention will find its greatest utility in non-porous composites wherein the polymeric media is present as a substantially continuous phase in which the solid particulate material is embedded as discrete particles.

Examples of thermosetting polymeric media suitable for the present invention include epoxy resins formed from mixtures of epichlorohydrin and bisphenol, phenolic resins formed from formaldehyde and phenol, unsaturated polyesters formed from mixtures of polyfunctional alcohols and polyfunctional acids, amino resins, alkyd resins, urethanes, silicones, cross-linked polyethylene and the like.

Examples of thermoplastic polymeric media which can be used in the invention are polyamides, polyesters, polyester amides, polyolefines, high-pressure and low-pressure polyethylenes, polypropylenes, polyvinyl chlorides, polyvinylidene chlorides, polychlorofluoroethylenes, polytetrafluoroethylenes, polystyrenes, cellulose acetobutyrates, polyacetals, polycarbonates and others, including copolymers of the foregoing.

While the filler of the present invention has been used successfully with a variety of thermosetting materials, it exhibits an unexpected advantage in respect to bonding directly to thermoplastic polymers. Various explanations can be given for the bonding of these particulate materials to thermosetting resins or rubbers during the curing, vulcanization and/or cross linking of the latter. However, the explanation for the tenacious bonding of the fillers to thermoplastic resins is not fully understood at present. Best results have been attained when incorporating the particulate material in nylon, which is illustrated by an example below.

The particulate material may, if desired, be provided with a surface coating of an organic coupling agent capable of chemically coupling with the particles and with the polymeric media in a composite, such as for example organic titanate and silane coupling agents. Useful coupling agents are disclosed, for example in U.S. Pat. Nos. 3,956,227, 3,893,496 and 3,948,830.

In a preferred embodiment, the particulate material has a bulk density in the range of about 1.1 to about 1.4, preferably about 1.2 to about 1.3, and gives high loadings, efficient flow due to "ball bearing" effect of its smooth, round particles, excellent surface finish due to improved compound flow, isotropic behavior (minimizing adverse stress concentration effects) and low oil adsorption, due to its low surface per unit volume. If higher loadings are desired in the composites, a secondary filler of larger particle size may be used to provide multi-modal packing.

EXAMPLES

The following examples illustrate the invention. All parts are by weight unless the contrary is indicated.

EXAMPLE 1

Figure 3:
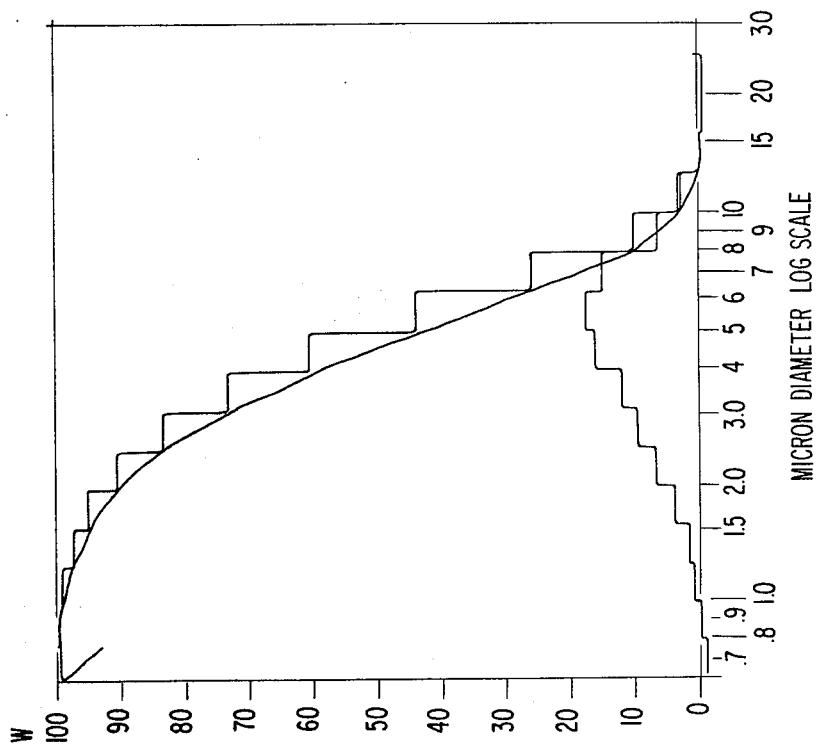
FIG. 3 is a graph showing particle size versus mass of a specific embodiment of the invention.

In unit number 5 at the Eastlake Ohio Generating Station of Cleveland Electric Illuminating Company, Class C Southern Ohio open pit bituminous coal, which has 12,300 BTU's per pound, 39% volatile matter, 48% fixed carbon and 12% ash, and an ash fusion temperature of 2300° F., is crushed in air-swept ball mills until about 60 to 85% of the coal will pass through a 200 mesh screen. The pulverized coal is injected in air suspension through a nozzle into the combustion chamber of the boiler and ignited with primary air, which is the same air that transfers the coal from the ball mills into and through the nozzles. Secondary air is injected into the combustion chamber to induce turbulence and to continuously remove a boundary layer of combustion products which continuously generates around the burning particles. The primary and secondary air, of which the secondary represents about 80%, together constitute a 15 to 25% excess over stoichiometric, and the combustion takes place at about 3,000° F., so that ash is molten. The ash is solidified in suspension in the combustion gases, and the gases and suspended diverse particles of flyash are cooled in the boiler. Particles of flyash discharged from the boiler are separated from the hot products of combustion by electrostatic precipitators and then are subjected to magnetic separation, preliminary air classification, and final air classification in the apparatus of FIG. 2 to produce a product having the particle size distribution shown in FIG. 3. In this material, 90% and 50% of the particles have particle sizes less than 8 and $5\mu$, respectively, the specific gravity is 2.4, the bulk density is about 1.24, 96% of a sample of 2500 particles when examined in potted and polished random cross sections in 5 SEM micrographs at 2000× fail to disclose evidence of a central void, about 93% of the particles are spherical and the specific surface is about 1.4 square meters per gram. This material exhibits tenacious bonding for polymeric media without water washing, acid treatment, oxidation, thermal treatment or other intervening chemical treatment.

EXAMPLE 2

Five parts of Nylon 6 Natural pellets, a product of American Polymer, Paterson, N.J., were placed between two Teflon coated aluminum plates and the plates were set in a press heated to 400° F. After allowing eight to ten minutes to bring the material up to temperature, a steady, even pressure build-up was applied until the pressure reached 2,500 pounds. The plates were removed, allowed to cool three minutes and separated. The resulting nylon sheet, which measured about 4½ inches by 6 inches, was cut into equal quarters. Two of the pieces were stacked on one of the plates and one part of the particular filler of Example 1 was spread on top of the stack. The two remaining quarters were then placed on top of the filler. The other Teflon plate was placed on top and the assembly was again put in the press, allowed to heat for eight to ten minutes, and subjected to 2,000 pounds of pressure. This resulted in some dispersion of the filler but the mixture was not homogenous. To obtain satisfactory dispersion, the resultant sheet was quartered, stacked and pressed again (without additional filler) until the procedure had been repeated about ten times. For the final pressing, two spacers approximately 0.045 inch thick were placed between the Teflon coated plates and a disc approximately 2½ inches in diameter by 0.045 inch in thickness was formed. The disc was cooled and small test samples were cut from the central portion. The sample was fractured, and SEM micrographs of the fractured surfaces disclosed surprising bonding of the particles to the nylon.

What is claimed is:

1. Particulate material, useful as a filler for polymeric media, composed of particles:
   at least about 85% of which (number basis) have a well-defined, regular, ellipsoidal shape;
   having a particle size less than about $25\mu$, with at least about 90% by weight of the particles having a size less than about $15\mu$, and at least about 50% being less than about $10\mu$,
   the specific surface of the particles being in the range of about 0.75 to about 2.5 square meters per gram;
   said particles having a specific gravity of about two to three, and
   being composed substantially of alumino-silicate glass.

2. Particulate material according to claim 1 wherein at least about 90% of said particles (number basis) have said well-defined, regular, ellipsoidal shape.

3. Particulate material according to claim 1 wherein at least about 95% of said particles (number basis) have said well-defined, regular, ellipsoidal shape.

4. Particulate material according to claim 1 wherein at least about 77% of said particles (number basis) are spherical.

5. Particulate material according to claim 1 wherein at least about 83% of said particles (number basis) are spherical.

6. Particulate material according to claim 1 wherein at least about 90% of said particles (number basis) are spherical.

7. Particulate material according to claim 1 wherein at least about 90% and at least about 50% by weight of the particles have diameters less than about $12\mu$ and about $7\mu$ respectively.

8. Particulate material according to claim 1 wherein the specific surface of the particles is about 1 to 2 square meters per gram.

9. Particulate material according to claim 1 wherein the specific surface of the particles is about 1.1 to about 1.7 square meters per gram.

10. Particulate material according to claim 1 wherein said particles have a specific gravity of about 2.2 to about 2.6.

11. Particulate material according to claim 1 wherein said particles have a specific gravity of about 2.35 to about 2.5.

12. Particulate material according to claim 1 wherein at least 85% (number basis) of the particles are substantially non-hollow.

13. Particulate material according to claim 1 characterized by the property that less than 10% of the particles counted in a potted and polished sample disclose the presence of central voids.

14. Particulate material according to claim 1 characterized by the property that less than 5% of the particles counted in a potted and polished sample disclose the presence of central voids.

15. Particulate material according to claim 1 having a bulk density of about 1.1 to about 1.4

16. Particulate material according to claim 1 having a bulk density of about 1.2 to about 1.3

17. Particulate material according to claim 1 wherein said particles are amorphous or generally amorphous particles containing up to about 5% of crystalline material.

18. Particulate material according to claim 1 wherein said particles contain less than 1% by weight of components soluble in water at room temperature.

19. Particulate material according to claim 1 wherein said particles contain less than 1% by weight of components which are thermally labile at 500° C.

20. Particulate material according to claim 1 wherein said particles contain less than 1% by weight of components soluble in water at room temperature and components which are thermally labile at 500° C.

21. Particulate material according to claim 1 characterized by receptivity to tenacious coupling with polymeric media or with silane or titanate coupling agents or both.

22. Particulate material according to claim 1 wherein the quantity of calcium oxide and hydroxide available on the surfaces of the particles for reaction with acid, if any, is less than 10% of the total particle weight.

23. Particulate material according to claim 1 wherein the quantity of calcium oxide and hydroxide available on the surfaces of the particles for reaction with acid, if any, is less than 1% of the total particle weight.

24. Particulate material according to claim 1 wherein said particles are stable against decrepitation at 300° C.

25. Particulate material according to claim 1 wherein said particles are stable against decrepitation at 600° C.

* * * * *